United States Patent
Lin (10) Patent No.: US 8,842,221 B2
(45) Date of Patent: *Sep. 23, 2014

(54) SIGNAL ADJUSTING CIRCUIT AND VIDEO APPARATUS THEREOF

(75) Inventor: Hsin-I Lin, Yilan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1346 days.

This patent is subject to a terminal disclaimer.

(21) Appl. No.: 12/176,428

(22) Filed: Jul. 21, 2008

(65) Prior Publication Data

US 2009/0290066 A1    Nov. 26, 2009

(30) Foreign Application Priority Data

May 26, 2008  (TW) ............................... 97119414 A (51) Int. Cl.
  *H03M 1/12*   (2006.01)
  *H04N 5/44*   (2011.01)
  *H04N 5/21*   (2006.01)

(52) U.S. Cl.
  CPC ....................................... *H04N 5/21* (2013.01)
  USPC ............................................ 348/572; 348/725

(58) Field of Classification Search
  USPC ......... 348/618–623, 725; 375/240.24–240.29
  See application file for complete search history.

(56) References Cited

U.S. PATENT DOCUMENTS

| | | | | |
|---|---|---|---|---|
| 5,210,610 A | * | 5/1993 | Kanashiki et al. | 348/672 |
| 5,363,145 A | * | 11/1994 | Go | 348/622 |
| 5,446,501 A | * | 8/1995 | Takemoto et al. | 348/620 |
| 5,448,309 A | | 9/1995 | Won | |
| 5,742,355 A | * | 4/1998 | De Haan et al. | 348/622 |
| 5,973,749 A | * | 10/1999 | Ishii et al. | 348/558 |
| 6,195,132 B1 | * | 2/2001 | Kimura et al. | 348/622 |
| 6,340,993 B1 | * | 1/2002 | Hasegawa et al. | 348/678 |
| 6,697,128 B1 | * | 2/2004 | Sowig et al. | 348/731 |
| 7,280,160 B2 | * | 10/2007 | Lee et al. | 348/620 |
| 2002/0047632 A1 | * | 4/2002 | Koyama | 315/291 |
| 2004/0095510 A1 | * | 5/2004 | Suzuki et al. | 348/465 |
| 2007/0223824 A1 | * | 9/2007 | Kato et al. | 382/232 |

OTHER PUBLICATIONS

"Office Action of Taiwan Counterpart Application", issued on Feb. 17, 2012, p. 1-p. 8.

* cited by examiner

*Primary Examiner* — Randy Flynn
(74) *Attorney, Agent, or Firm* — Jianq Chyun IP Office (57) ABSTRACT

A signal adjusting circuit and a video apparatus thereof are provided. The signal adjusting circuit includes a delay unit, a minimum value acquisition device, and a first operating unit. The delay unit receives a digital signal and delays the digital signal for N periods to serve as a delay signal. The minimum value acquisition device receives the digital signal and acquires a minimum value of the digital signal in every N periods. The first operating unit is coupled to the delay unit and the minimum value acquisition device for operating the delay signal with the minimum value to obtain an adjusting signal.

14 Claims, 5 Drawing Sheets

SIGNAL ADJUSTING CIRCUIT AND VIDEO APPARATUS THEREOF

CROSS-REFERENCE TO RELATED APPLICATION

This application claims the priority benefit of Taiwan application serial no. 97119414, filed on May 26, 2008. The entirety of the above-mentioned patent application is hereby incorporated by reference herein and made a part of specification.

BACKGROUND OF THE INVENTION

1. Field of the Invention

The present invention relates to a signal adjusting circuit. More particularly, the present invention relates to a signal adjusting circuit and a video apparatus thereof which may eliminate an alternating component of a signal.

2. Description of Related Art

Recently, digital television technique is quickly developed. The digital television relates to a novel transmission technique, which may convert analog signals sent from a television station into digital signals for transmission. Compared to a conventional analog television, the digital television has advantages of multi-channel, interactivity, mobile receiving and asynchrony, etc.

Figure 1:
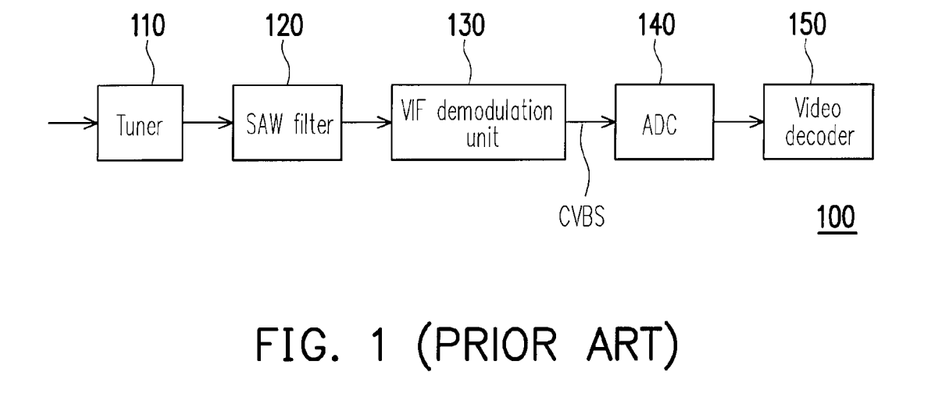
FIG. 1 is a block diagram illustrating a conventional video apparatus.
Figure 2:
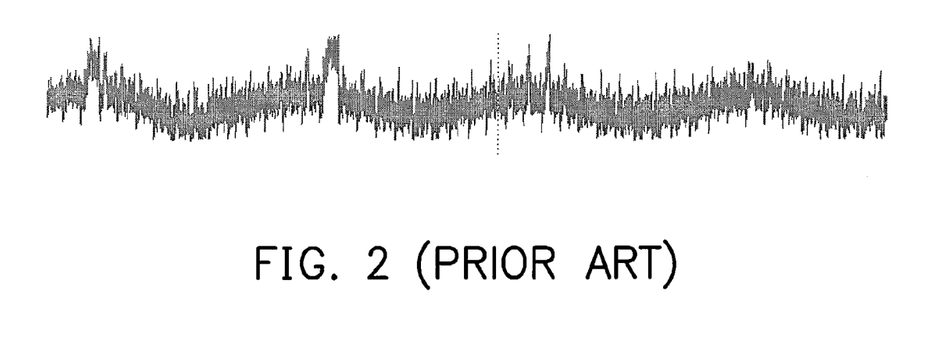
FIG. 2 is a waveform diagram of signals output from a conventional analog-to-digital converter (ADC).

FIG. 1 is a block diagram illustrating a conventional video apparatus. Referring to FIG. 1, since a signal may have a co-channel interference phenomenon during transmission, after a radio frequency signal (i.e. the analog signal sent from the television station) is processed by a tuner 110, a surface acoustic wave (SAW) filter 120 and a video intermediate frequency (VIF) demodulation unit 130, a composite video baseband signal (CVBS) is output. Then, an analog-to-digital converter (ADC) 140 converts the CVBS to generate a digital signal, wherein the digital signal may have an alternating component, as shown in FIG. 2. Next, the digital signal is transmitted to a video decoder 150 for decoding, and since the digital signal has the alternating component, luminance of images and the images output from the video apparatus 100 may be unstable. Therefore, a user viewing the images may have an uncomfortable feeling.

SUMMARY OF THE INVENTION

The present invention is directed to a signal adjusting circuit and a video apparatus thereof, which may effectively eliminate an alternating component of a signal, so that unstableness of luminance of images output from the video apparatus can be avoided.

The present invention provides a signal adjusting circuit including a delay unit, a minimum value acquisition device, and a first operating unit. The delay unit receives a digital signal and delays the digital signal for N periods to serve as a delay signal, wherein N is greater than or equal to 1. The minimum value acquisition device receives the digital signal and acquires a minimum value of the digital signal in every N periods. The first operating unit is coupled to the delay unit and the minimum value acquisition device for operating the delay signal with the minimum value to obtain an adjusting signal.

The present invention provides a video apparatus including an analog-to-digital converter (ADC), a signal adjusting circuit and a video decoder. The ADC receives an analog signal, and converts the analog signal into a digital signal. The signal adjusting circuit includes a delay unit, a minimum value acquisition device, and a first operating unit. The delay unit is coupled to the ADC for receiving the digital signal and delaying the digital signal for N periods to serve as a delay signal, wherein N is greater than or equal to 1. The minimum value acquisition device is coupled to the ADC for receiving the digital signal and acquiring a minimum value of the digital signal in every N periods. The first operating unit is coupled to the delay unit and the minimum value acquisition device for operating the delay signal with the minimum value to obtain an adjusting signal. The video decoder is coupled to the signal adjusting circuit for decoding a filtered digital signal and the adjusting signal, so as to generate a video signal required by the video apparatus.

In the present invention, the digital signal is first delayed for N periods via the delay unit of the signal adjusting circuit to generate the delay signal. Then, the minimum value of the digital signal is acquired by the minimum value acquisition device in every N periods. Next, the delay signal and the minimum value are operated by the first operating unit, so as to generate the adjusting signal. By such means, the alternating component of the digital signal caused by co-channel interference can be effectively eliminated, so that a signal waveform can be relatively smooth (swinging up and down of the signal waveform is eliminated). Therefore, the luminance of the image output from the video apparatus can be more stable.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 3:
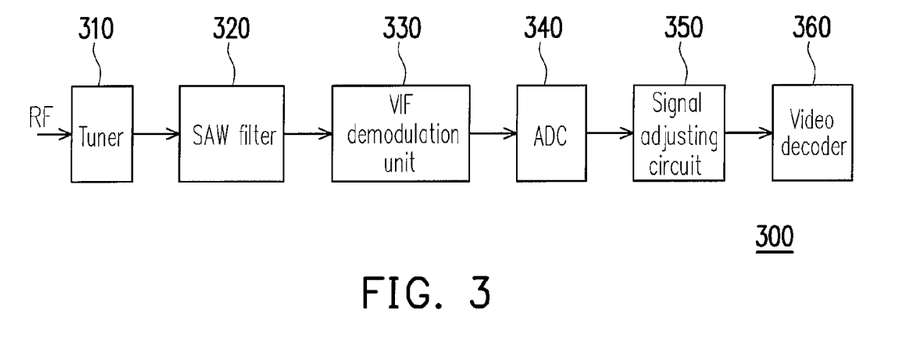
FIG. 3 is a block diagram illustrating a video apparatus according to an embodiment of the present invention.

FIG. 3 is a block diagram illustrating a video apparatus according to an embodiment of the present invention. Referring to FIG. 3, the video apparatus 300 includes a tuner 310, a SAW filter 320, a VIF demodulation unit 330, an analog-to-digital converter (ADC) 340, a signal adjusting circuit 350 and a video decoder 360.

The tuner 310 receives a radio frequency signal, and generates a turning tuning signal. The SAW filter 320 is coupled to the tuner 310 for filtering noise component of the tuning signal, and only allowing the signal with a specific frequency to pass. The VIF demodulation unit 330 is coupled to the SAW filter 320 for modulating the filtered tuning signal, so as to generate an analog video signal.

The ADC 340 receives the analog signal generated by the VIF demodulation unit 330, and converts the analog signal into a digital signal. Wherein, the digital signal may have an alternating component due to a co-channel interference phenomenon, and a waveform thereof is as that shown in FIG. 2.

In the present embodiment, the signal adjusting circuit 350 adjusts the digital signal to generate an adjusting signal, and the adjusting signal is a digital signal with the alternating component being eliminated, and is transmitted to the video decoder 360.

The video decoder 360 is coupled to the signal adjusting circuit 350 for decoding the filtered digital video signal and the adjusting signal, so as to generate the video signal required by the video apparatus 300. By such means, since the adjusting signal generated by the signal adjusting circuit 350 does not have the alternating component, a waveform of the adjusting signal can be relatively smooth, so that after the video decoder 360 decodes the adjusting signal, luminance of the image output from the video apparatus 300 can be relatively stable. Therefore, a user may have a more comfortable feeling while viewing the image.

In the above content, functions to be achieved by the signal adjusting circuit 350 of the video apparatus 300 are schematically described. To fully describe how the signal adjusting circuit 350 effectively eliminates the alternating component of the digital signal for those skilled in the art, another embodiment is provided below.

Figure 4:
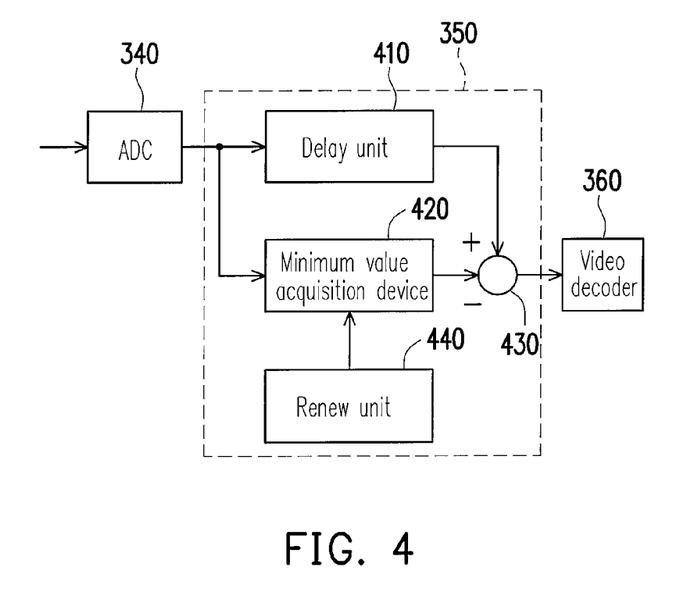
FIG. 4 is a block diagram illustrating a signal adjusting circuit according to an embodiment of the present invention.

FIG. 4 is a block diagram illustrating a signal adjusting circuit 350 according to an embodiment of the present invention. Referring to FIG. 4, the signal adjusting circuit 350 includes a delay unit 410, a minimum value acquisition device 420 and a first operating unit 430. The delay unit 410 receives the digital signal output from the ADC 340, and delays the digital signal for N periods to serve as a delay signal, wherein N is greater than or equal to 1. In the present embodiment, N is set to be greater than or equal to 1, namely, N is not necessarily to be an integer, which may be set to be a decimal. For example, if N=1.2, the delay unit 410 delays the digital signal for 1.2 period, for example, 1.2 horizontal line period.

Referring to FIG. 4 again, the minimum value acquisition device 420 receives the digital signal, and acquires the minimum value of the digital signal in every N periods. Namely, when the minimum value acquisition device 420 receives the digital signal, the minimum value of the digital signal is acquired in every N periods to serve as a basis for adjusting the digital signal. Moreover, an interval period of the minimum value of the digital signal acquired by the minimum value acquisition device 420 is the same to a period for delaying the digital signal via the delay unit 410, so that the delay signal and the minimum value can be synchronous.

The first operating unit 430 is coupled to the delay unit 410 and the minimum value acquisition device 420 for operating the delay signal with the minimum value, so as to obtain the adjusting signal. In the present embodiment, the first operating unit 430 is for example, a subtracter. Namely, when the first operating unit 430 receives the delay signal and the minimum value, an operation of subtracting the delay signal with the minimum value is performed, so as to obtain the adjusting signal. Next, the video decoder 360 decodes the received adjusting signal and transmits it to a next stage circuit (not shown). Moreover, the next stage circuit continuously performs the signal processing (i.e. eliminates the alternating component of the adjusting signal), so that the luminance of the image output from the video apparatus 300 can be more stable.

Moreover, the signal adjusting circuit 350 further includes a renew unit 440. The renew unit 440 is coupled to the minimum value acquisition device 420 for resetting the minimum value output from the minimum value acquisition device 420 in every N periods. In the present embodiment, the renew unit 440 is for example, an up counter without range limitation. Namely, each time when the counter counts N periods (assumed to be 1.2 horizontal line period), a signal is enabled to the minimum value acquisition device 420 for resetting the minimum value output from the minimum value acquisition device 420. For example, the minimum value acquisition device 420 acquires the minimum value of the digital signal within a present N periods, and when a counting result of the counter indicates that the present N periods is completed, the minimum value acquisition device 420 then outputs an acquisition result (the minimum value) of the digital signal obtained within the present N periods to the operating unit 430, and eliminates the acquisition result for acquiring the minimum value of the digital signal of a next N periods.

Figure 5:
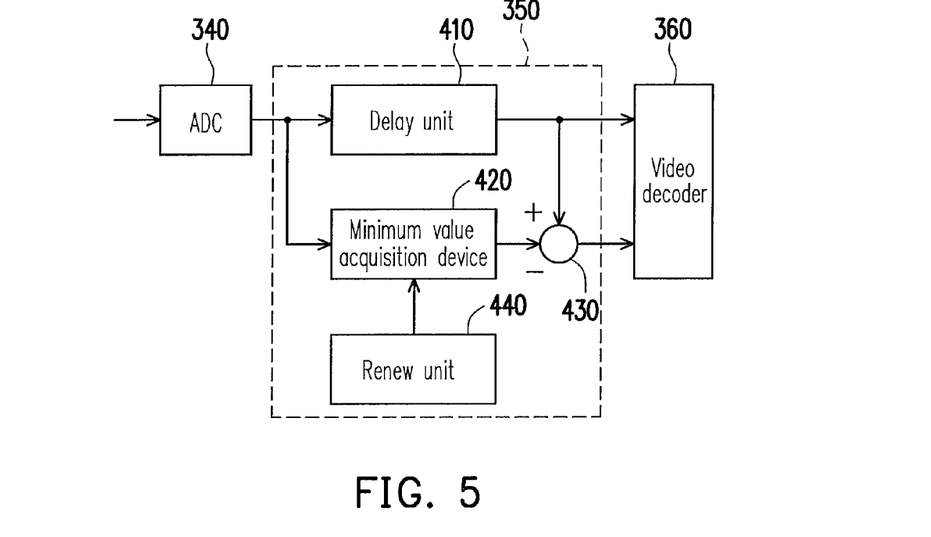
FIG. 5 is a block diagram illustrating a signal adjusting circuit according to another embodiment of the present invention.

FIG. 5 is a block diagram illustrating a signal adjusting circuit 350 according to another embodiment of the present invention. A circuit structure of FIG. 5 is the same or similar to that of FIG. 4, and only the signal output from the signal adjusting circuit 350 to the video decoder 360 is different. Therefore, the devices with the same functions in FIG. 5 and FIG. 4 are assigned with the same reference numerals, and detailed description thereof is not repeated. A difference between FIG. 5 and FIG. 4 is that the signal adjusting circuit 350 of FIG. 4 only transmits the adjusting signal to the video decoder 360, and the signal adjusting circuit 350 of FIG. 5 not only transmits the adjusting signal to the video decoder 360, but also transmits the delay signal to the video decoder 360 for decoding. For example, a path for the operating unit 430 of FIG. 5 transmitting the adjusting signal to the video decoder 360 can be a sync timing path of the video signal, so as to provides a timing for the video decoder 360 and a next stage circuit (not shown) to process the video data. A path for the delay unit 410 of FIG. 5 transmitting the delay signal to the video decoder 360 can be a video data path of the video signal, so as to provide the video data to the video decoder 360 and the next stage circuit (not shown).

Figure 6:
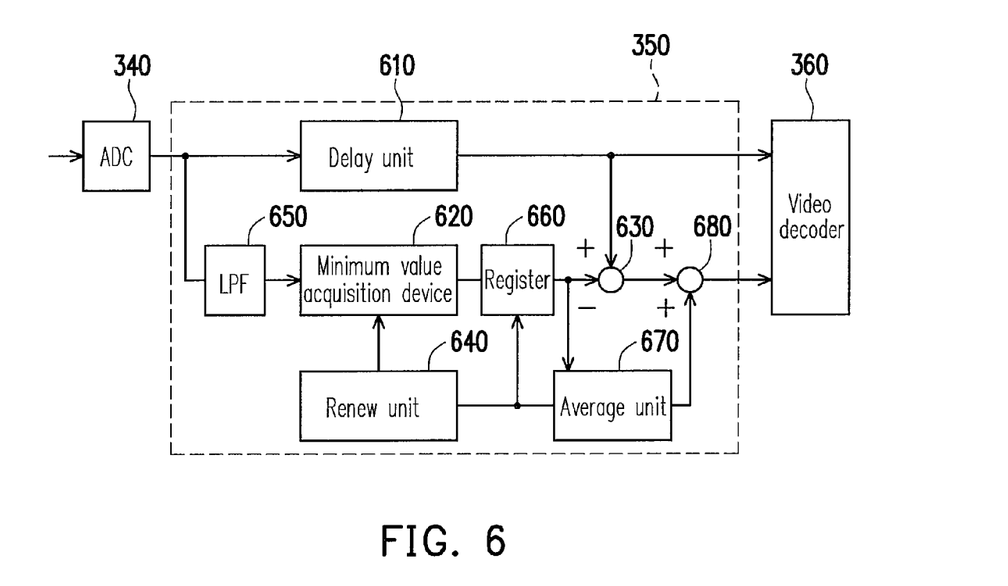
FIG. 6 is a block diagram illustrating a signal adjusting circuit according to still another embodiment of the present invention.

FIG. 6 is a block diagram illustrating a signal adjusting circuit 350 according to still another embodiment of the present invention. Referring to FIG. 6, the signal adjusting circuit 350 includes a delay unit 610, a minimum value acquisition device 620, a first operating unit 630, a renew unit 640, a low pass filter (LPF) 650, a register 660, an average unit 670 and a second operating unit 680. In the present embodiment, the delay unit 610, the minimum value acquisition device 620, the first operating unit 630 and the renew unit 640 can be implemented by the delay unit 410, the minimum value acquisition device 420, the first operating unit 430 and the renew unit 440 of FIG. 4, and therefore detailed description thereof will not be repeated.

Referring to FIG. 6 again, the LPF 650 is coupled to the minimum value acquisition device 620 for receiving the digital signal output from the ADC 340, and outputting the digital signal with high frequency noise thereof being filtered to the minimum value acquisition device 620. The register 660 is coupled between the minimum value acquisition device 620 and the first operating unit 630 for latching the minimum value output from the minimum value acquisition device 620 in every N periods, and outputting a latching result to the first operating unit 630 for being operated with the delay signal. In the present embodiment, the first operating unit 630 is for example, a subtracter. Namely, when the first operating unit 630 receives the latching result and the delay signal, an operation of subtracting the delay signal with the latching result is performed.

The average unit 670 is coupled to the register 660 for counting an average value of the latching results output from the register 660. For example, if the average unit 670 counts that the average value of the latching results output from the register 660 is 15, the average unit 670 then outputs the average value 15 to the second operating unit 680.

The second operating unit 680 is coupled to the first operating unit 630 and the average unit 670 for operating the adjusting signal with the average value, so as to obtain a second adjusting signal. In the present embodiment, the second operating unit 680 is for example, an adder. Namely, when the second operating unit 680 receives the adjusting signal and the average value, an operation of adding the adjusting signal to the average value is performed.

Figure 7A:
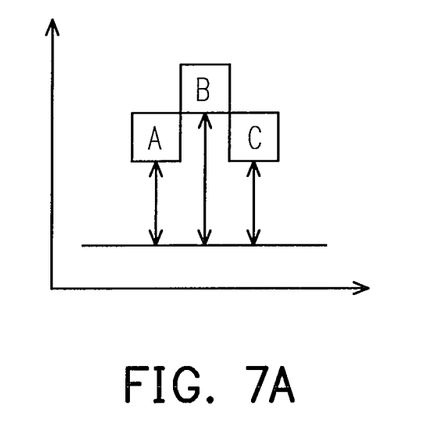
FIGS. 7A-7C are schematic diagrams illustrating methods for generating adjusting signals according to an embodiment of the present invention.

Referring to FIG. 7A, a vertical axis thereof represents the digital signals output from the ADC 340, and a horizontal axis thereof represents time. Wherein, A, B and C represent different durations of the adjacent N periods (1.2 horizontal line period) on the time axis, and bi-directional arrows respectively represent differences between the digital signals of the durations A, B and C and a baseline (i.e. the minimum values). For example, if the horizontal line period is T seconds, a block of the duration A probably represents the digital signals output from the ADC 340 within 0-1.2 T seconds; a block of the duration B probably represents the digital signals output from the ADC 340 within 1.2 T-2.4 T seconds; and a block of the duration C probably represents the digital signals output from the ADC 340 within 2.4 T-3.6 T seconds.

Assuming in the duration A, the minimum value of the digital signal acquired by the minimum value acquisition device 620 is 10, when a counting result of the renew unit 640 indicates that the present duration A is completed, the minimum value acquisition device 620 then outputs an acquisition result (the minimum value 10) of the digital signal of the present duration A to the register 660, and eliminates the acquisition result for acquiring the minimum value of the digital signal of a next N periods (the duration B).

Figure 7B:
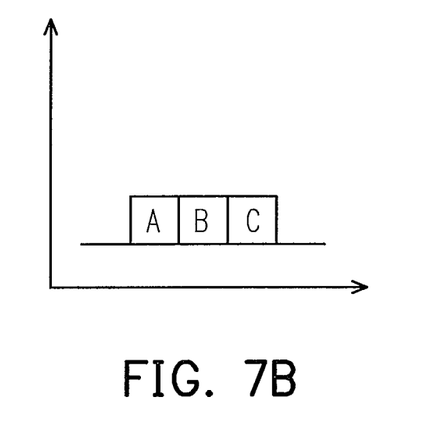

While the minimum value acquisition device 620 starts to acquire the minimum value of the digital signal of the duration B, the delay unit 610 also starts to provide the digital signal of the duration A (i.e. the delay signal), and the register 660 also provides the latching result (i.e. the minimum value of the digital signal of the duration A, which is 10 herein). Therefore, after the first operating unit 630 performs the operation of subtracting the delay signal with the latching result, the digital signal of the duration A can be pulled down. Referring to FIG. 7B, a vertical axis thereof represents the outputs of the first operating unit 630, and the horizontal axis thereof represents time. As shown in FIG. 7B, the first operating unit 630 successfully pulls down the digital signal of the duration A.

Figure 7C:
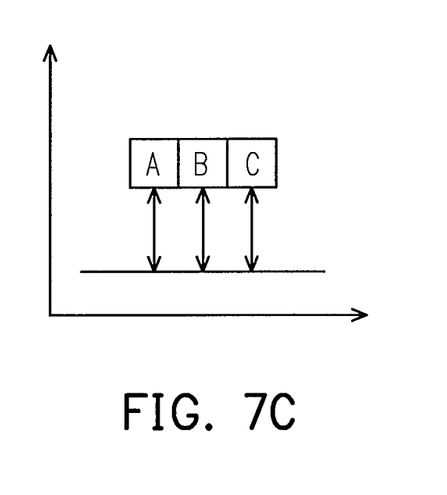

Here, assuming the average unit 670 counts that the average value of the historical latching results output from the register 660 is 15. Though now an output value 10 of the register 660 is transmitted to the average unit 670 to perform an average operation with the original average value 15, since a weight of the output value of the register 660 is relatively small (assumed to be 1/100 herein, which may be set according to an actual design requirement), the average unit 670 may output a new average value (about 14.95, which is rather closed to the original average value 15) to the second operating unit 680. Referring to FIG. 7C, a vertical axis thereof represents the outputs of the second operating unit 680, and the horizontal axis thereof represents time. As shown in FIG. 7C, the second operating unit 680 successfully pulls up the digital signal of the duration A.

Assuming the minimum value acquisition device 620 acquires the minimum value of the digital signal of the duration B provided by the ADC 340 to be 20. When the counting result of the renew unit 640 indicates that the present duration B is completed, the minimum value acquisition device 620 then outputs an acquisition result (the minimum value 20) of the digital signal of the present duration B to the register 660, and eliminates the acquisition result for acquiring the minimum value of the digital signal of a next N periods (the duration C).

While the minimum value acquisition device 620 starts to acquire the minimum value of the digital signal of the duration C, the delay unit 610 also starts to provide the digital signal of the duration B (i.e. the delay signal), and the register 660 also provides the latching result (i.e. the minimum value of the digital signal of the duration B, which is 20 herein). Therefore, after the first operating unit 630 performs the operation of subtracting the delay signal with the latching result, the digital signal of the duration B can be pulled down. As shown in FIG. 7B, the first operating unit 630 successfully pulls down the digital signal of the duration B.

Meanwhile, the output value 20 of the register 660 is transmitted to the average unit 670 to perform an average operation with the former average value 14.95, and a new average value (about 15.00, which is rather closed to the former average value 14.95) is output to the second operating unit 680. As shown in FIG. 7C, the second operating unit 680 successfully pulls up the digital signal of the duration B, and pull up heights of the duration A and the duration B are almost the same.

Next, Assuming the minimum value acquisition device 620 acquires the minimum value of the digital signal of the duration C provided by the ADC 340 to be 10. When the counting result of the renew unit 640 indicates that the present duration C is completed, the minimum value acquisition device 620 then outputs an acquisition result of the digital signal of the present duration C to the register 660. Now, the register 660 starts to provide the latching result (i.e. the minimum value of the digital signal of the duration C, which is 10 herein), and meanwhile the delay unit 610 also starts to provide the digital signal of the duration C (the delay signal). Therefore, after the first operating unit 630 performs the operation of subtracting the delay signal with the latching result, the digital signal of the duration C can be pulled down. As shown in FIG. 7B, the first operating unit 630 successfully pulls down the digital signal of the duration C.

Figure 8:
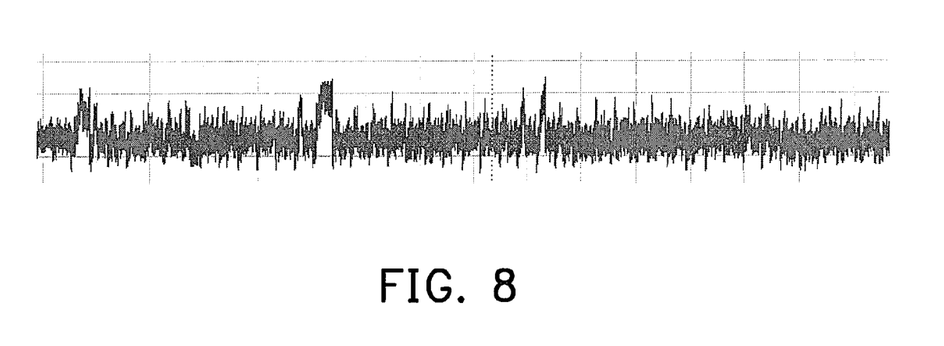
FIG. 8 is a waveform diagram of a second adjusting signal according to an embodiment of the present invention.

Meanwhile, the output value 10 of the register 660 is transmitted to the average unit 670 to perform an average operation with the former average value 15.00, and a new average value (about 14.95, which is rather closed to the former average value 15.00) is output to the second operating unit 680. As shown in FIG. 7C, the second operating unit 680 successfully pulls up the digital signal of the duration C. Therefore, the pull up heights of the digital signals of the durations A, B and C are almost the same, so that swinging up and down of the digital signals of the durations A-C is avoided, and accordingly the alternating component of the digital signals caused by co-channel interference can be effectively eliminated. Moreover, an actual measuring waveform of the second adjusting signal output by the second operating unit 680 can be as that shown in FIG. 8. According to FIG. 8, the second adjusting signal almost has no alternating component compared to the signal of FIG. 2. Therefore, after the second adjusting signal is transmitted to the video decoder 360 for decoding, the luminance of the image output from the video apparatus 300 can be more stable, and unstable of the luminance and the image can be avoided.

In summary, in the video apparatus of the present embodiment, the digital signal is first delayed for N periods via the delay unit of the signal adjusting circuit to generate the delay signal. Then, the minimum value of the digital signal is acquired by the minimum value acquisition device in every N periods. Next, the delay signal and the minimum value are operated to generate the adjusting signal, so that the next stage circuit may eliminate the alternating component of the signal according to the adjusting signal. Moreover, in the present embodiment, the average value output from the average unit can be directly operated with the adjusting signal, so as to generate the second adjusting signal (i.e. the signal without the alternating component). By such means, the alternating component of the digital signal caused by co-channel interference can be effectively eliminated, so that the signal waveform can be relatively smooth (swinging up and down of the signal waveform is eliminated). Therefore, the luminance of the image output from the video apparatus can be more stable.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A signal adjusting circuit, comprising:
a delay unit, directly coupled to an analog-to-digital converter (ADC), receiving a digital signal from the ADC, and delaying the received digital signal for N periods to output a delay signal, wherein N is greater than or equal to 1;
a minimum value acquisition device, directly coupled to the ADC, receiving the digital signal, and acquiring and outputting a minimum value within the received digital signal in every N periods;
a first operating unit, coupled to the delay unit and the minimum value acquisition device, receiving the delay signal from the delay unit, receiving the minimum value from the minimum value acquisition device, and operating the received delay signal with the received minimum value to output an adjusting signal;
a register, coupled between the minimum value acquisition device and the first operating unit, latching the minimum value output from the minimum value acquisition device in every N periods, and outputting a latching result to the first operating unit for being operated with the delay signal;
an average unit, coupled to the register, receiving latching results from the register, and counting an average value of the latching results; and
a second operating unit, coupled to the first operating unit and the average unit, and operating the adjusting signal with the average value to obtain a second adjusting signal.

2. The signal adjusting circuit as claimed in claim 1 further comprising a renew unit, coupled to the minimum value acquisition device, and resetting the minimum value output from the minimum value acquisition device in every N periods.

3. The signal adjusting circuit as claimed in claim 2, wherein the renew unit is a counter.

4. The signal adjusting circuit as claimed in claim 1, wherein the first operating unit is a subtracter.

5. The signal adjusting circuit as claimed in claim 1, further comprising:
a low pass filter, coupled to the minimum value acquisition device, receiving the digital signal from the ADC, and outputting the digital signal with high frequency noise thereof being filtered to the minimum value acquisition device.

6. The signal adjusting circuit as claimed in claim 1, wherein the second operating unit is an adder.

7. A video apparatus, comprising:
an analog-to-digital converter (ADC), receiving an analog signal, and converting the analog signal into a digital signal;
a signal adjusting circuit, comprising:
a delay unit, directly coupled to the ADC, receiving the digital signal from the ADC, and delaying the received digital signal for N periods to output a delay signal, wherein N is greater than or equal to 1;
a minimum value acquisition device, directly coupled to the ADC, receiving the digital signal, and acquiring and outputting a minimum value within the digital signal in every N periods;
a first operating unit, coupled to the delay unit and the minimum value acquisition device, receiving the delay signal from the delay unit, receiving the minimum value from the minimum value acquisition device, and operating the received delay signal with the received minimum value to output an adjusting signal;
a register, coupled between the minimum value acquisition device and the first operating unit, latching the minimum value output from the minimum value acquisition device in every N periods, and outputting a latching result to the first operating unit for being operated with the delay signal;
an average unit, coupled to the register, receiving latching results from the register, and counting an average value of the latching results; and
a second operating unit, coupled to the first operating unit and the average unit, and operating the adjusting signal with the average value to obtain a second adjusting signal; and
a video decoder, coupled to the signal adjusting circuit, decoding the delay signal and the adjusting signal to generate a video signal required by the video apparatus.

8. The video apparatus as claimed in claim 7 further comprising a renew unit, coupled to the minimum value acquisition device, and resetting the minimum value output from the minimum value acquisition device in every N periods.

9. The video apparatus as claimed in claim 7, further comprising:
a tuner, receiving a radio frequency signal, and generating a tuning signal;
a surface acoustic wave (SAW) filter, coupled to the tuner, filtering a noise component of the tuning signal, and allowing signals with a specific frequency to pass; and
a video intermediate frequency (VIF) demodulation unit, coupled to the SAW filter, modulating a filtered tuning signal to generate the analog video signal.

10. The video apparatus as claimed in claim 7, wherein the analog video signal is a composite video baseband signal (CVBS).

11. The video apparatus as claimed in claim 7, wherein the renew unit is a counter.

12. The video apparatus as claimed in claim 7, wherein the first operating unit is a subtracter.

13. The video apparatus as claimed in claim 7, further comprising:
- a low pass filter, coupled to the minimum value acquisition device, receiving the digital signal, and outputting the digital signal with high frequency noise thereof being filtered to the minimum value acquisition device.

14. The video apparatus as claimed in claim 7, wherein the second operating unit is an adder.

* * * * *